US009263732B2

(12) United States Patent
Nagase et al.

(10) Patent No.: US 9,263,732 B2
(45) Date of Patent: Feb. 16, 2016

(54) POSITIVE ELECTRODE ACTIVE MATERIAL FOR LITHIUM-ION BATTERY, POSITIVE ELECTRODE FOR A LITHIUM-ION BATTERY, LITHIUM-ION BATTERY USING SAME, AND PRECURSOR TO A POSITIVE ELECTRODE ACTIVE MATERIAL FOR A LITHIUM-ION BATTERY

(71) Applicant: JX Nippon Mining & Metals Corporation, Chiyoda-ku, Tokyo (JP)

(72) Inventors: Ryuichi Nagase, Kitaibaraki (JP); Yasuhiro Kawahashi, Kitaibaraki (JP)

(73) Assignee: JX Nippon Mining & Metals Corporation, Tokyo (JP)

(*) Notice: Subject to any disclaimer, the term of this patent is extended or adjusted under 35 U.S.C. 154(b) by 0 days.

(21) Appl. No.: 14/580,318

(22) Filed: Dec. 23, 2014

(65) Prior Publication Data

US 2015/0123029 A1  May 7, 2015

Related U.S. Application Data

(63) Continuation of application No. 13/508,887, filed as application No. PCT/JP2010/071723 on Dec. 3, 2010, now abandoned.

(30) Foreign Application Priority Data

Dec. 22, 2009 (JP) ................. 2009-290772

(51) Int. Cl.
*H01M 4/525* (2010.01)
*H01M 4/48* (2010.01)
*H01M 4/131* (2010.01)
*H01M 4/505* (2010.01)
*H01M 4/485* (2010.01)
*C01G 53/00* (2006.01)
*H01M 10/0525* (2010.01)
*H01M 4/02* (2006.01)

(52) U.S. Cl.
CPC ............... *H01M 4/131* (2013.01); *C01G 53/44* (2013.01); *H01M 4/485* (2013.01); *H01M 4/505* (2013.01); *H01M 4/525* (2013.01); *C01P 2004/61* (2013.01); *C01P 2006/11* (2013.01); *C01P 2006/12* (2013.01); *C01P 2006/40* (2013.01); *H01M 10/0525* (2013.01); *H01M 2004/021* (2013.01); *Y02E 60/122* (2013.01)

(58) Field of Classification Search
None
See application file for complete search history.

(56) References Cited

U.S. PATENT DOCUMENTS

| | | | |
|---|---|---|---|
| 2,165,128 A | 7/1939 | Cheesman | |
| 4,443,186 A | 4/1984 | Shell | |
| 4,462,793 A | 7/1984 | Maeda et al. | |
| 4,469,654 A | 9/1984 | Haskett et al. | |
| 5,393,622 A | 2/1995 | Nitta et al. | |
| 5,449,577 A | 9/1995 | Dahn et al. | |
| 5,478,674 A | 12/1995 | Miyasaka | |
| 5,759,714 A | 6/1998 | Matsufuji et al. | |
| 6,037,095 A | 3/2000 | Miyasaka | |
| 6,123,911 A | 9/2000 | Yamaguchi et al. | |
| 6,423,447 B1 | 7/2002 | Ohsaki et al. | |
| 6,582,854 B1 | 6/2003 | Qi et al. | |
| 6,984,469 B2 | 1/2006 | Kweon et al. | |
| 7,332,248 B2 | 2/2008 | Kase et al. | |
| 7,410,728 B1 | 8/2008 | Fujimoto et al. | |
| 7,645,542 B2 | 1/2010 | Kase et al. | |
| 8,354,191 B2 | 1/2013 | Shizuka et al. | |
| 8,623,551 B2 | 1/2014 | Kawahashi et al. | |
| 8,748,041 B2 | 6/2014 | Satoh et al. | |
| 8,993,160 B2 | 3/2015 | Nagase | |
| 9,090,481 B2 | 7/2015 | Satoh | |
| 9,118,076 B2 | 8/2015 | Kajiya et al. | |
| 2002/0106561 A1 | 8/2002 | Lee et al. | |
| 2003/0082448 A1 | 5/2003 | Cho et al. | |
| 2003/0104279 A1 | 6/2003 | Miyazaki et al. | |
| 2003/0126803 A1 | 7/2003 | Rosenflanz | |
| 2003/0211391 A1 | 11/2003 | Cho et al. | |
| 2004/0053134 A1 | 3/2004 | Ozaki et al. | |
| 2004/0110063 A1 | 6/2004 | Uchitomi et al. | |

(Continued)

FOREIGN PATENT DOCUMENTS

| | | |
|---|---|---|
| CN | 1520621 A | 8/2004 |
| CN | 1701451 A | 11/2005 |

(Continued)

OTHER PUBLICATIONS

European communication issued Aug. 5, 2015 in co-pending European patent application No. EP 11750707.9.
Yamada, et al., "Synthesis and properties of LiNiO2 as cathode material for secondary batteries", Journal of Power Sources, vol. 54, No. 2, Apr. 1, 1995, pp. 209-213.
Whittingham, Stanley M., "Lithium Batteries and Cathode Materials", Chem. Rev. 2004, 104, 4271-4301.
Notice of Allowance mailed Aug. 26, 2015 in co-pending U.S. Appl. No. 13/695,663.
Notice of Allowance mailed Sep. 10, 2015 in co-pending U.S. Appl. No. 13/576,753.

(Continued)

*Primary Examiner* — Yoshitoshi Takeuchi
(74) *Attorney, Agent, or Firm* — Nields, Lemack & Frame, LLC

(57) ABSTRACT

The present invention provides a positive electrode active material for lithium ion batteries, which realizes a lithium ion battery that is, while satisfying fundamental characteristics of a battery (capacity, efficiency, load characteristics), low in the resistance and excellent in the lifetime characteristics. In the positive electrode active material for lithium ion batteries, the variation in the composition of transition metal that is a main component inside of particles of or between particles of the positive electrode active material, which is defined as a ratio of the absolute value of the difference between a composition ratio inside of the particles of or in a small area between the particles of the transition metal and a composition ratio in a bulk state to the composition ratio in a bulk state of the transition metal, is 5% or less.

6 Claims, No Drawings

(56) References Cited

U.S. PATENT DOCUMENTS

| | | |
|---|---|---|
| 2004/0197658 A1 | 10/2004 | Kase et al. |
| 2005/0079416 A1 | 4/2005 | Ohzuku et al. |
| 2005/0142442 A1 | 6/2005 | Yuasa et al. |
| 2005/0158546 A1 | 7/2005 | Shizuka |
| 2006/0083989 A1 | 4/2006 | Suhara et al. |
| 2006/0121350 A1 | 6/2006 | Kajiya et al. |
| 2006/0127765 A1 | 6/2006 | Machida et al. |
| 2006/0204849 A1 | 9/2006 | Saito et al. |
| 2006/0233696 A1 | 10/2006 | Paulsen et al. |
| 2006/0281005 A1 | 12/2006 | Cho et al. |
| 2007/0015058 A1 | 1/2007 | Takezawa et al. |
| 2007/0141469 A1 | 6/2007 | Tokunaga et al. |
| 2007/0202405 A1 | 8/2007 | Shizuka et al. |
| 2007/0248883 A1 | 10/2007 | Oda et al. |
| 2007/0298512 A1 | 12/2007 | Park et al. |
| 2008/0044736 A1 | 2/2008 | Nakura |
| 2008/0081258 A1 | 4/2008 | Kim et al. |
| 2009/0117464 A1 | 5/2009 | Cho et al. |
| 2009/0117469 A1 | 5/2009 | Hiratsuka et al. |
| 2009/0148772 A1 | 6/2009 | Kawasato et al. |
| 2009/0233176 A1 | 9/2009 | Kita et al. |
| 2009/0286164 A1 | 11/2009 | Wada et al. |
| 2009/0289218 A1 | 11/2009 | Kajiya et al. |
| 2009/0299922 A1 | 12/2009 | Malcus et al. |
| 2009/0305136 A1 | 12/2009 | Yada et al. |
| 2010/0015514 A1 | 1/2010 | Miyagi et al. |
| 2010/0019194 A1 | 1/2010 | Fujiwara et al. |
| 2010/0112447 A1 | 5/2010 | Yamamoto et al. |
| 2010/0136412 A1 | 6/2010 | Watanabe |
| 2010/0143583 A1 | 6/2010 | Honda et al. |
| 2010/0183922 A1 | 7/2010 | Cho et al. |
| 2010/0196761 A1 | 8/2010 | Tatsumi et al. |
| 2010/0209757 A1 | 8/2010 | Ooyama et al. |
| 2010/0209771 A1 | 8/2010 | Shizuka et al. |
| 2010/0227222 A1 | 9/2010 | Chang et al. |
| 2011/0031437 A1 | 2/2011 | Nagase et al. |
| 2011/0033749 A1 | 2/2011 | Uchida et al. |
| 2011/0076558 A1 | 3/2011 | Miyazaki et al. |
| 2011/0250499 A1 | 10/2011 | Hiratsuka |
| 2012/0034525 A1 | 2/2012 | Satoh et al. |
| 2012/0231342 A1 | 9/2012 | Satoh et al. |
| 2012/0231343 A1 | 9/2012 | Nagase et al. |
| 2012/0244434 A1 | 9/2012 | Nagase |
| 2012/0292562 A1 | 11/2012 | Kajiya et al. |
| 2012/0319036 A1 | 12/2012 | Kajiya et al. |
| 2012/0319037 A1 | 12/2012 | Kawahashi et al. |
| 2012/0319039 A1 | 12/2012 | Satoh et al. |
| 2012/0319040 A1 | 12/2012 | Okamoto et al. |
| 2012/0321956 A1 | 12/2012 | Kawahashi et al. |
| 2012/0326080 A1 | 12/2012 | Okamoto et al. |
| 2012/0326098 A1 | 12/2012 | Satoh |
| 2012/0326099 A1 | 12/2012 | Satoh |
| 2012/0326101 A1 | 12/2012 | Satoh |
| 2012/0326102 A1 | 12/2012 | Satoh |
| 2013/0001463 A1 | 1/2013 | Okamoto et al. |
| 2013/0004849 A1 | 1/2013 | Satoh |
| 2013/0043428 A1 | 2/2013 | Kawahashi et al. |
| 2013/0108921 A1 | 5/2013 | Kase et al. |
| 2013/0143121 A1 | 6/2013 | Kobayashi et al. |
| 2013/0175470 A1 | 7/2013 | Kajiya et al. |
| 2013/0221271 A1 | 8/2013 | Nagase et al. |
| 2013/0316239 A1 | 11/2013 | Okamoto |
| 2014/0306152 A1 | 10/2014 | Okamoto |
| 2014/0339465 A1 | 11/2014 | Okamoto |
| 2014/0339466 A1 | 11/2014 | Okamoto |
| 2015/0188134 A1 | 7/2015 | Kameyama et al. |

FOREIGN PATENT DOCUMENTS

| | | |
|---|---|---|
| CN | 1710735 A | 12/2005 |
| CN | 1947288 A | 4/2007 |
| CN | 101478044 A | 7/2009 |
| EP | 0794155 A1 | 9/1997 |
| EP | 0903796 A1 | 3/1999 |
| EP | 1244164 A1 | 9/2002 |
| EP | 1317008 A2 | 6/2003 |
| EP | 1391950 A1 | 2/2004 |
| EP | 1450423 A1 | 8/2004 |
| EP | 1742281 A1 | 1/2007 |
| EP | 2023426 A1 | 2/2009 |
| EP | 2207226 A1 | 7/2010 |
| EP | 2207227 A1 | 7/2010 |
| EP | 2219251 A1 | 8/2010 |
| EP | 2533333 A1 | 12/2012 |
| EP | 2544272 A1 | 1/2013 |
| JP | 4-328277 A | 11/1992 |
| JP | 6-275274 A | 9/1994 |
| JP | 7-29603 A | 1/1995 |
| JP | 7-211311 A | 8/1995 |
| JP | 8-138669 A | 5/1996 |
| JP | 8-213015 A | 8/1996 |
| JP | 09-82325 A | 3/1997 |
| JP | 9-120813 A | 5/1997 |
| JP | 9-270257 A | 10/1997 |
| JP | 10-83815 A | 3/1998 |
| JP | 10-116618 A | 5/1998 |
| JP | 10-188986 A | 7/1998 |
| JP | 10-206322 A | 8/1998 |
| JP | 10-208744 A | 8/1998 |
| JP | 10-302779 A | 11/1998 |
| JP | 10-321224 A | 12/1998 |
| JP | 10-334919 A | 12/1998 |
| JP | 11-16573 A | 1/1999 |
| JP | 11-67205 A | 3/1999 |
| JP | 11-273676 A | 10/1999 |
| JP | 11-292542 A | 10/1999 |
| JP | 11-307094 A | 11/1999 |
| JP | 11-345615 A | 12/1999 |
| JP | 2000-30693 A | 1/2000 |
| JP | 2000-72445 A | 3/2000 |
| JP | 2000-149945 A | 5/2000 |
| JP | 2000-215884 A | 8/2000 |
| JP | 2000-348721 A | 12/2000 |
| JP | 2001-110420 A | 4/2001 |
| JP | 2001-148249 A | 5/2001 |
| JP | 2001-223008 A | 8/2001 |
| JP | 2001-266851 A | 9/2001 |
| JP | 2002-63901 A | 2/2002 |
| JP | 2002-124261 A | 4/2002 |
| JP | 3276183 B2 | 4/2002 |
| JP | 2002-164053 A | 6/2002 |
| JP | 2002-203552 A | 7/2002 |
| JP | 2002-216745 A | 8/2002 |
| JP | 2002-260655 A | 9/2002 |
| JP | 2002-289261 A | 10/2002 |
| JP | 2002-298914 A | 10/2002 |
| JP | 3334179 B2 | 10/2002 |
| JP | 2003-7299 A | 1/2003 |
| JP | 2003-17052 A | 1/2003 |
| JP | 2003-048719 A | 2/2003 |
| JP | 2003-81637 A | 3/2003 |
| JP | 2003-151546 A | 5/2003 |
| JP | 2003-229129 A | 8/2003 |
| JP | 2004-6264 A | 1/2004 |
| JP | 2004-146374 A | 5/2004 |
| JP | 2004-172109 A | 6/2004 |
| JP | 2004-193115 A | 7/2004 |
| JP | 2004-214187 A | 7/2004 |
| JP | 3539223 B2 | 7/2004 |
| JP | 2004-227790 A | 8/2004 |
| JP | 2004-253169 A | 9/2004 |
| JP | 2004-273451 A | 9/2004 |
| JP | 2004-355824 A | 12/2004 |
| JP | 2004-356094 A | 12/2004 |
| JP | 2005-11713 A | 1/2005 |
| JP | 2005-44743 A | 2/2005 |
| JP | 2005-53764 A | 3/2005 |
| JP | 2005-56602 A | 3/2005 |
| JP | 2005-60162 A | 3/2005 |
| JP | 2005-75691 A | 3/2005 |
| JP | 2005-183366 A | 7/2005 |
| JP | 2005-225734 A | 8/2005 |
| JP | 2005-235624 A | 9/2005 |

(56) References Cited

FOREIGN PATENT DOCUMENTS

| | | |
|---|---|---|
| JP | 2005-243636 A | 9/2005 |
| JP | 2005-251700 A | 9/2005 |
| JP | 2005-285572 A | 10/2005 |
| JP | 2005-289700 A | 10/2005 |
| JP | 2005-302507 A | 10/2005 |
| JP | 2005-302628 A | 10/2005 |
| JP | 2005-324973 A | 11/2005 |
| JP | 2005-327644 A | 11/2005 |
| JP | 2005-332707 A | 12/2005 |
| JP | 2005-347134 A | 12/2005 |
| JP | 2006-4724 A | 1/2006 |
| JP | 2006-19229 A | 1/2006 |
| JP | 2006-19310 A | 1/2006 |
| JP | 2006-54159 A | 2/2006 |
| JP | 2006-107818 A | 4/2006 |
| JP | 2006-107845 A | 4/2006 |
| JP | 2006-127923 A | 5/2006 |
| JP | 2006-127955 A | 5/2006 |
| JP | 2006-134816 A | 5/2006 |
| JP | 2006-134852 A | 5/2006 |
| JP | 2006-156126 A | 6/2006 |
| JP | 2006-156235 A | 6/2006 |
| JP | 2006-164758 A | 6/2006 |
| JP | 2006-286614 A | 10/2006 |
| JP | 3835266 B2 | 10/2006 |
| JP | 2006-302542 A | 11/2006 |
| JP | 2006-351379 A | 12/2006 |
| JP | 2007-48744 A | 2/2007 |
| JP | 2007-95443 A | 4/2007 |
| JP | 2007-194202 A | 8/2007 |
| JP | 2007-214138 A | 8/2007 |
| JP | 2007-226969 A | 9/2007 |
| JP | 2007-227368 A | 9/2007 |
| JP | 2007-257890 A | 10/2007 |
| JP | 2007-280723 A | 10/2007 |
| JP | 2008-13405 A | 1/2008 |
| JP | 4070585 B2 | 4/2008 |
| JP | 2008-103132 A | 5/2008 |
| JP | 2008-181708 A | 8/2008 |
| JP | 2008-192547 A | 8/2008 |
| JP | 2008-266136 A | 11/2008 |
| JP | 2008-277106 A | 11/2008 |
| JP | 2008-282613 A | 11/2008 |
| JP | 4175026 B2 | 11/2008 |
| JP | 2008-544468 A | 12/2008 |
| JP | 2009-117365 A | 5/2009 |
| JP | 2009-135070 A | 6/2009 |
| JP | 2009-151959 A | 7/2009 |
| JP | 4287901 B2 | 7/2009 |
| JP | 2009-289726 A | 12/2009 |
| JP | 2010-15959 A | 1/2010 |
| JP | 2010-47466 A | 3/2010 |
| JP | 2010-192200 A | 9/2010 |
| JP | 2011-44364 A | 3/2011 |
| JP | 2012-169224 A | 9/2012 |
| JP | 2012-243572 A | 12/2012 |
| JP | 2013-152911 A | 8/2013 |
| KR | 10-2010-0060362 A | 6/2010 |
| TW | 363940 | 7/1999 |
| WO | 02/086993 A1 | 10/2002 |
| WO | 03/003489 A1 | 1/2003 |
| WO | 2004/064180 A1 | 7/2004 |
| WO | 2007/072759 A1 | 6/2007 |
| WO | 2008/084679 A1 | 7/2008 |
| WO | 2009/011157 A1 | 1/2009 |
| WO | 2009/060603 A1 | 5/2009 |
| WO | 2009/063838 A1 | 5/2009 |
| WO | 2009/128289 A1 | 10/2009 |
| WO | 2010/049977 A1 | 5/2010 |
| WO | 2010/113512 A1 | 10/2010 |
| WO | 2010/113583 A1 | 10/2010 |
| WO | 2011/007751 A1 | 1/2011 |
| WO | 2011/065391 A1 | 6/2011 |
| WO | 2011/108720 A1 | 9/2011 |
| WO | 2011/122448 A1 | 10/2011 |
| WO | 2012/098724 A1 | 7/2012 |
| WO | 2012/132071 A1 | 10/2012 |
| WO | 2012/132072 A1 | 10/2012 |
| WO | 2012/157143 A1 | 11/2012 |

OTHER PUBLICATIONS

Notice of Allowance mailed Sep. 22, 2015 in co-pending U.S. Appl. No. 13/582,096.
Notice of Allowance mailed Oct. 22, 2015 in co-pending U.S. Appl. No. 13/582,101.
Notice of Allowance mailed Oct. 22, 2015 in co-pending U.S. Appl. No. 13/582,113.
Office action mailed Sep. 29, 2015 in co-pending U.S. Appl. No. 13/816,822.
Final rejection mailed Aug. 14, 2015 in co-pending U.S. Appl. No. 13/822,447.
Notice of Allowance mailed Oct. 21, 2015 in co-pending U.S. Appl. No. 13/984,947.
Notice of Allowance mailed Sep. 8, 2015 in co-pending U.S. Appl. No. 14/364,795.
Notice of Allowance mailed Sep. 10, 2015 in co-pending U.S. Appl. No. 14/364,809.
Office action mailed Sep. 8, 2015 in co-pending U.S. Appl. No. 14/364,830.
International Preliminary Report on Patentability mailed Jul. 31, 2014 in co-pending PCT application No. PCT/JP2012/074263.
International Preliminary Report on Patentability mailed Jul. 31, 2014 in co-pending PCT application No. PCT/JP2012/074266.
Journal of the Electrochemical Society, 151 (11), 2004, pp. A1899-A1904, "Synthesis, Thermal, and Electrochemical Properties of AlPO4-Coated LiNi0.8Co0.1Mn0.1O2 Cathode Materials for Li-Ion Cell", Cho, et al.
Journal of The Electrochemical Society, 155 (3), 2008, pp. A239-A245, "Storage Characteristics of LiNi0.8Co0.1+xMn0.1-xO2 (x=0, 0.03 and 0.06) Cathode Materials for Lithium Ion Batteries", EOM, et al.
Machine English translation for CN 1710735 (2005), 9 pages, European Patent Office, http://translationportal.epo.org . . . , retrieved from the internet Oct. 6, 2014.
Final Rejection mailed Sep. 18, 2014 in corresponding U.S. Appl. No. 13/508,887.
Office Action mailed Sep. 18, 2014 in corresponding U.S. Appl. No. 13/856,514.
Office Action mailed Oct. 9, 2014 in co-pending U.S. Appl. No. 13/695,663.
Office Action mailed Sep. 9, 2014 in co-pending U.S. Appl. No. 13/514,080.
Office Action mailed Oct. 2, 2014 in co-pending U.S. Appl. No. 13/582,089.
Office Action mailed Oct. 3, 2014 in co-pending U.S. Appl. No. 13/581,730.
Office Action mailed Nov. 5, 2014 in co-pending U.S. Appl. No. 13/582,087.
European communication dated Oct. 27, 2014 in corresponding European patent application No. EP 10839166.5.
European communication dated Nov. 5, 2014 in co-pending European patent application No. EP 11856183.6.
European communication dated Oct. 20, 2014 in co-pending European patent application No. EP 12763420.2.
International Search Report mailed Jun. 8, 2010 in co-pending PCT application No. PCT/JP2010/053443.
International Preliminary Report on Patentability mailed Nov. 17, 2011 in co-pending PCT application No. PCT/JP2010/053443.
International Search Report mailed May 24, 2011 in co-pending PCT application No. PCT/JP2011/053271.
International Preliminary Report on Patentability mailed Sep. 26, 2013 in co-pending PCT application No. PCT/JP2011/053271.
International Search Report/Written Opinion mailed Mar. 8, 2011 in corresponding PCT application No. PCT/JP2010/071723.
International Preliminary Report on Patentability mailed Jul. 12, 2012 in corresponding PCT application No. PCT/JP2010/071723.
International Search Report mailed Jan. 24, 2012 in co-pending PCT application No. PCT/JP2011/072860.

(56) References Cited

OTHER PUBLICATIONS

International Preliminary Report on Patentability mailed Oct. 10, 2013 in co-pending PCT application No. PCT/JP2011/072860.
International Search Report/Written Opinion mailed Jan. 25, 2011 in co-pending PCT application No. PCT/JP2010/071724.
International Preliminary Report on Patentability issued Jul. 10, 2012 in co-pending PCT application No. PCT/JP2010/071724.
International Search Report mailed Apr. 26, 2011 in co-pending PCT application No. PCT/JP2011/052394.
International Preliminary Report on Patentability mailed Oct. 11, 2012 in co-pending PCT application No. PCT/JP2011/052394.
European communication issued May 9, 2014 in co-pending European patent application No. EP 11739870.1.
International Search Report mailed May 10, 2011 in co-pending PCT application No. PCT/JP2011/052399.
International Preliminary Report on Patentability mailed Oct. 11, 2012 in co-pending PCT application No. PCT/JP2011/052399.
International Search Report mailed Nov. 15, 2011 in co-pending PCT application No. PCT/JP2011/069042.
International Preliminary Report on Patentability mailed Aug. 1, 2013 in co-pending PCT application No. PCT/JP2011/069042.
International Search Report/Written Opinion mailed Jun. 7, 2011 in co-pending PCT application No. PCT/JP2011/054935.
International Preliminary Report on Patentability mailed Oct. 11, 2012 in co-pending PCT application No. PCT/JP2011/054935.
Japanese Communication mailed Oct. 1, 2013 in co-pending Japanese patent application No. JP 2012-503253.
International Search Report mailed Jun. 7, 2011 in co-pending PCT application No. PCT/JP2011/054938.
International Preliminary Report on Patentability mailed Nov. 22, 2012 in co-pending PCT application No. PCT/ JP2011/054938.
Japanese Communication mailed Oct. 1, 2013 in co-pending Japanese patent application No. JP 2012-503255.
International Search Report/Written Opinion mailed May 17, 2011 in co-pending PCT application No. PCT/JP2011/054942.
International Preliminary Report on Patentability issued Oct. 2, 2012 in co-pending PCT application No. PCT/JP2011/054942.
International Search Report/Written Opinion mailed Jun. 7, 2011 in co-pending PCT application No. PCT/JP2011/054934.
International Preliminary Report on Patentability mailed Oct. 11, 2012 in co-pending PCT application No. PCT/JP2011/054934.
Japanese Communication mailed Oct. 1, 2013 in co-pending Japanese patent application No. JP 2012-503252.
International Search Report/Written Opinion mailed May 17, 2011 in co-pending PCT application No. PCT/JP2011/054941.
International Preliminary Report on Patentability issued Oct. 2, 2012 in co-pending PCT application No. PCT/JP2011/054941.
International Search Report mailed May 10, 2011 in co-pending PCT application No. PCT/JP2011/055111.
International Preliminary Report on Patentability mailed Nov. 22, 2012 in co-pending PCT application No. PCT/JP2011/055111.
International Search Report/Written Opinion mailed May 17, 2011 in co-pending PCT application No. PCT/JP2011/053710.
International Preliminary Report on Patentability issued Oct. 2, 2012 in co-pending PCT application No. PCT/JP2011/053710.
Chinese communication dated May 12, 2014 in co-pending Chinese patent application No. CN 201180008573.3.
International Search Report/Written Opinion mailed May 24, 2011 in co-pending PCT application No. PCT/JP2011/054777.
International Preliminary Report on Patentability issued Oct. 2, 2012 in co-pending PCT application No. PCT/JP2011/054777.
European communication issued May 9, 2014 in co-pending European patent application No. EP 11750704.6.
International Search Report mailed May 24, 2011 in co-pending PCT application No. PCT/JP2011/054781.
Written Opinion mailed Jun. 24, 2011 in co-pending PCT application No. PCT/JP2011/054781.
International Preliminary Report on Patentability mailed Oct. 11, 2012 in co-pending PCT application No. PCT/JP2011/054781.
International Search Report/Written Opinion mailed May 24, 2011 in co-pending PCT application No. PCT/JP2011/054779.
International Preliminary Report on Patentability issued Oct. 2, 2012 in co-pending PCT application No. PCT/JP2011/054779.
European communication issued May 22, 2014 in co-pending European patent application No. EP 11750705.3.
International Search Report mailed Nov. 1, 2011 in co-pending PCT application No. PCT/JP2011/066722.
International Preliminary Report on Patentability mailed Jun. 13, 2013 in co-pending PCT application No. PCT/JP2011/066722.
European communication issued May 6, 2014 in co-pending European patent application No. EP 11845955.1.
International Search Report mailed Apr. 10, 2012 in co-pending PCT application No. PCT/JP2011/079535.
International Search Report mailed Jun. 5, 2012 in co-pending PCT application No. PCT/JP2012/057974.
International Preliminary Report on Patentability mailed Oct. 10, 2013 in co-pending PCT application No. PCT/JP2012/057974.
Office Action mailed Feb. 25, 2015 in co-pending U.S. Appl. No. 13/508,880.
Final Rejection mailed Feb. 24, 2015 in co-pending U.S. Appl. No. 13/695,663.
Final Rejection mailed Feb. 27, 2015 in co-pending U.S. Appl. No. 13/581,730.
Office Action mailed Feb. 26, 2015 in co-pending U.S. Appl. No. 13/582,101.
Office Action mailed Feb. 26, 2015 in co-pending U.S. Appl. No. 13/582,113.
Office Action mailed Dec. 4, 2013 in co-pending U.S. Appl. No. 13/508,880.
Final Rejection mailed Jun. 18, 2014 in co-pending U.S. Appl. No. 13/508,880.
Office Action-Restriction-mailed Mar. 12, 2013 in corresponding U.S. Appl. No. 13/508,887.
Office Action mailed Jun. 10, 2013 in corresponding U.S. Appl. No. 13/508,887.
Final Rejection mailed Sep. 19, 2013 in corresponding U.S. Appl. No. 13/508,887.
Office Action mailed Sep. 17, 2013 in corresponding U.S. Appl. No. 13/856,514.
Final Rejection mailed Feb. 27, 2014 in corresponding U.S. Appl. No. 13/856,514.
Office Action mailed Jul. 16, 2013 in co-pending U.S. Appl. No. 13/514,080.
Office Action mailed Dec. 18, 2013 in co-pending U.S. Appl. No. 13/514,080.
Final Rejection mailed Jun. 3, 2014 in co-pending U.S. Appl. No. 13/514,080.
Office Action mailed Jul. 29, 2013 in co-pending U.S. Appl. No. 13/573,548.
Final Rejection mailed Jan. 9, 2014 in co-pending U.S. Appl. No. 13/576,548.
Office Action mailed Jul. 1, 2014 in co-pending U.S. Appl. No. 13/576,548.
Office Action mailed Jul. 8, 2014 in co-pending U.S. Appl. No. 13/576,753.
Office Action mailed Aug. 1, 2013 in abandoned U.S. Appl. No. 13/581,546.
Final Rejection mailed Jan. 27, 2014 in abandoned U.S. Appl. No. 13/581,546.
Office Action mailed Aug. 13, 2013 in abandoned U.S. Appl. No. 13/582,067.
Final Rejection mailed Jan. 24, 2014 in abandoned U.S. Appl. No. 13/582,067.
Office Action mailed Jul. 17, 2013 in abandoned U.S. Appl. No. 13/581,814.
Final Rejection mailed Jan. 27, 2014 in abandoned U.S. Appl. No. 13/581,814.
Office Action mailed Jun. 19, 2013 in co-pending U.S. Appl. No. 13/582,096.
Final Rejection mailed Feb. 20, 2014 in co-pending U.S. Appl. No. 13/582,096.

(56) References Cited

OTHER PUBLICATIONS

Office Action mailed Jul. 12, 2013 in co-pending U.S. Appl. No. 13/582,101.
Final Rejection mailed Feb. 7, 2014 in co-pending U.S. Appl. No. 13/582,101.
Office Action mailed Jul. 15, 2013 in co-pending U.S. Appl. No. 13/582,113.
Final Rejection mailed Feb. 18, 2014 in co-pending U.S. Appl. No. 13/582,113.
Office Action mailed Nov. 14, 2014 in co-pending U.S. Appl. No. 13/582,096.
Notice of Allowance mailed Jan. 15, 2015 in co-pending U.S. Appl. No. 13/514,080.
Final Rejection mailed Jan. 23, 2015 in co-pending U.S. Appl. No. 13/576,548.
Final Rejection mailed Jan. 28, 2015 in co-pending U.S. Appl. No. 13/576,753.
Office Action—Restriction—mailed Jan. 26, 2015 in co-pending U.S. Appl. No. 13/581,423.
Final Rejection mailed Feb. 12, 2015 in co-pending U.S. Appl. No. 13/582,089.
Final Rejection mailed Feb. 13, 2015 in co-pending U.S. Appl. No. 13/582,087.
Journal of Power Sources, vol. 146, 2005, pp. 39-44, "Performance of LiNiCoO2 materials for advanced lithium-ion batteries", Itou, et al.
Ceramics International, vol. 35, No. 4, May, 2009, pp. 1633-1639, "Fine-sized LiNi0.8Co0.15Mn0.05O2 cathode particles prepared by spray pyrolysis from the polymeric precursor solutions", Ju, et al.
Journal of Alloys and Compounds, vol. 469, No. 1-2, Feb. 2009, pp. 304-309, "Effects of the ratio of manganese and nickel components on the characteristics of Lix(MnyNi1-y)Oz cathode powders prepared by spray pyrolysis", Ju, et al.
Journal of Power Sources, vol. 153, No. 2, Feb. 2006, pp. 345-349, "Improvement of 12V overcharge behavior of LiCoO2 cathode material by LiNi0.8Co0.1Mn0.1O2 addition in a Li-ion cell", Kim, et al.
Journal of Applied Electrochemistry, vol. 38, No. 5, Jan. 2008, pp. 613-617, "Comparative study of the preparation and electrochemical performance of LiNi1/2Mn1/2O2 electrode material for rechargeable lithium batteries", Lian, et al.
European Communication dated Jan. 5, 2015 in co-pending European patent application No. 11842456.3.
European Communication dated Dec. 9, 2014 in co-pending European patent application No. 11750768.1.
European Communication dated Dec. 9, 2014 in co-pending European patent application No. 11750762.4.
European Communication dated Feb. 17, 2015 in co-pending European patent application No. 11865511.7.
Chinese Communication dated Jan. 12, 2015 in co-pending Chinese patent application No. 201280004477.6.
International Search Report mailed Jan. 7, 2014 in co-pending PCT application No. PCT/JP2013/076598.
Journal of the The Electrochemical Society, vol. 151, No. 10, Sep. 2004, pp. A1707-A1711, "Comparison of Overcharge Behavior of AlPO4-Coated LiCoO2 and LiNi0.8Co0.1Mn0.1O2 Cathode Materials in Li-Ion Cells", Cho, et al.
Japanese communication mailed Apr. 7, 2015 in co-pending Japanese patent application No. 2012-503258.
International Preliminary Report on Patentability mailed Mar. 19, 2015 in co-pending PCT application No. PCT/JP2013/064941.
International Preliminary Report on Patentability mailed Apr. 2, 2015 in co-pending PCT application No. PCT/JP2013/076598.
Wikipedia, Karl Fischer Titration article, Waybackmachine.com snapshot dtd., Sep. 12, 2010, 2 pages.
Office Action mailed Mar. 25, 2015 in co-pending U.S. Appl. No. 13/581,423.
Office Action mailed Mar. 18, 2015 in co-pending U.S. Appl. No. 13/816,822.
Office Action mailed Apr. 3, 2015 in co-pending U.S. Appl. No. 13/822,447.
Office Action mailed Apr. 23, 2015 in co-pending U.S. Appl. No. 14/364,795.
Office Action mailed Apr. 3, 2015 in co-pending U.S. Appl. No. 14/364,809.
Office Action mailed Apr. 3, 2015 in co-pending U.S. Appl. No. 14/364,830.
Office Action mailed May 14, 2015 in co-pending U.S. Appl. No. 13/984,947.
Final Rejection mailed Jul. 29, 2015 in co-pending U.S. Appl. No. 13/508,880.
Office Action mailed Jun. 4, 2015 in co-pending U.S. Appl. No. 13/695,663.
Notice of Allowance mailed Jun. 30, 2015 in co-pending U.S. Appl. No. 13/576,548.
Notice of Allowance mailed May 20, 2015 in co-pending U.S. Appl. No. 13/582,087.
Final Rejection mailed Jun. 23, 2015 in co-pending U.S. Appl. No. 13/582,096.
Final Rejection mailed Jul. 1, 2015 in co-pending U.S. Appl. No. 13/582,101.
Final Rejection mailed Jun. 30, 2015 in co-pending U.S. Appl. No. 13/582,113.
Final Rejection mailed Jun. 24, 2015 in co-pending U.S. Appl. No. 13/816,822.
Electrochimica Acta, vol. 51, 2006, pp. 5581-5586, "Preparation and electrochemical properties of LiCoO2- LiNi0.5Mn0.5O2-Li2MnO3 solid solutions with high Mn contents", Sun, et al.
International Journal of Inorganic Materials 3 (2001), pp. 323-329, "Structural and electrochemical properties of Li—Ni—Co oxides synthesized by wet chemistry via a succinic-acid-assisted technique", Castro-Garcia, et al.
Int. J. Electrochem. Sci., vol. 4, 2009, pp. 1770-1778, "Improved High Rate Cycling of Li-rich Li(1.10)Ni(1/3)Co(1/3)Mn (1/3)O(2) Cathode for Lithium Batteries", Santhanam, et al.
International Search Report mailed Dec. 25, 2012 in co-pending PCT application No. PCT/JP2012/074263.
International Search Report mailed Dec. 25, 2012 in co-pending PCT application No. PCT/JP2012/074266.
International Search Report mailed Aug. 27, 2013 in co-pending PCT application No. PCT/JP2013/064941.

POSITIVE ELECTRODE ACTIVE MATERIAL FOR LITHIUM-ION BATTERY, POSITIVE ELECTRODE FOR A LITHIUM-ION BATTERY, LITHIUM-ION BATTERY USING SAME, AND PRECURSOR TO A POSITIVE ELECTRODE ACTIVE MATERIAL FOR A LITHIUM-ION BATTERY

This application is a continuation of U.S. patent application Ser. No. 13/508,887 filed May 9, 2012, which is a 371 of PCT/JP2010/071723 filed Dec. 3, 2010, which claims priority of Japanese Patent Application No. 2009-290772 filed Dec. 22, 2009, the disclosures of which are incorporated herein by reference.

TECHNICAL FIELD OF THE INVENTION

The present invention relates to a positive electrode active material for lithium ion batteries, a positive electrode for lithium ion batteries and a lithium ion battery therewith, and a precursor for positive electrode active material for lithium ion batteries.

BACKGROUND OF THE INVENTION

In a positive electrode active material for lithium ion batteries, a lithium-containing transition metal oxide is generally used. Specifically, lithium cobalt oxide ($LiCoO_2$), lithium nickel oxide ($LiNiO_2$), and lithium manganese oxide ($LiMn_2O4$) are cited, and, in order to enhance an improvement in the characteristics (higher capacity, cycle characteristics, storage characteristics, reduction of internal resistance, charge and discharge characteristics) and safety, these have been studied by complexing. In particular, for a lithium ion battery for large devices such as automobiles and road levelers, characteristics different from those for conventional portable telephones and personal computers are demanded. Specifically, the positive electrode active material for use in automobiles is required to be high in capacity and low in the resistance, and the positive electrode active material for use in road levelers is required to be high in the capacity and long in the lifetime.

Powder characteristics are important in order to develop these characteristics. However, homogeneity in distributions of transition metal and lithium that are main components of the positive electrode active material of a lithium ion battery is particularly important. The homogeneity of the composition is particularly indispensable for obtaining low resistance for use in automobiles and the long lifetime for use in road levelers.

In Japanese Patent Application Laid-Open No. 2005-285572 (patent document 1) related to application by Nikko-Materials Co., Ltd (current appellation: JX Nippon Mining & Metals Co., Ltd.), to which the present inventors belong, the following fact was found and reported. That is, as a manufacturing method of a precursor for positive electrode active material, a method in which an aqueous solution of chloride of Ni, Mn or Co is poured into a suspension of lithium carbonate, and, the resulted carbonate is washed with a saturated solution of lithium carbonate or ethanol is used, a molar ratio of an amount of Li to a total amount of metals can be adjusted and the variation thereof can be reduced.

Further, in Japanese Patent Application Laid-Open No. 2001-110420 (patent document 2), it is described that, after studying large secondary particles where small crystalline primary particles are flocculated, and magnitude of particles of lithium carbonate that is a raw material, it was found that a cohesion force is enhanced by controlling the particle size of lithium carbonate, and thereby a positive electrode active material homogeneously reacted not only on a surface of the secondary particles of lithium cobalt oxide but also inside of the secondary particles of lithium cobalt oxide and having excellent discharged capacity characteristics and cycle characteristics can be obtained. Further, it is described that, when such a positive electrode active material is synthesized without variation in composition to the inside of lithium cobalt oxide configured of spherical or elliptical secondary particles in which primary particles of small crystal are flocculated, a positive electrode active material for nonaqueous electrolyte secondary batteries characterized in that not only the primary particles on a surface forming the secondary particle but also the primary particles inside of the secondary particle can be used as a battery. Specifically, it is described that, according to the analysis of sections of secondary particles of lithium cobalt oxide with an electron probe microanalyzer (EPMA), a ratio of spectral intensities of O/Co of oxygen and cobalt inside of the particles is within 3.0±0.5.

(Patent documents 1) Japanese Patent Application Laid-Open No. 2005-285572

(Patent documents 2) Japanese Patent Application Laid-Open No. 2001-110420

SUMMARY OF THE INVENTION

However, there is still a room for improvement as a positive electrode active material that realizes a lithium ion battery which is, while satisfying fundamental characteristics of a battery (capacity, efficiency, load characteristics), low in the resistance and excellent in the lifetime characteristics.

The invention intends to provide a positive electrode active material for lithium ion batteries, which realizes a lithium ion battery that is, while satisfying fundamental characteristics of a battery (capacity, efficiency, load characteristics), low in the resistance and excellent in the lifetime characteristics. Further, the invention further intends to separately provide a positive electrode for lithium ion batteries which use the positive electrode active material for lithium ion batteries, a lithium ion battery therewith, and a precursor for positive electrode active material for lithium ion batteries.

The present inventors have found, after studying hard by paying attention also to homogeneity other than an amount of Li in a positive electrode active material, that, when a positive electrode active material where the variation in the composition of transition metal that is a main component is controlled in a specified range is used, a lithium ion battery which is, while satisfying fundamental characteristics of a battery (capacity, efficiency, load characteristics), low in the resistance and excellent in the lifetime characteristics can be provided.

The invention completed based on the above findings is in an aspect a positive electrode active material for lithium ion batteries, which is composed of at least lithium and transition metal. In the positive electrode active material for lithium ion batteries, the variation in the composition of transition metal that is a main component inside of particles of or between particles of the positive electrode active material, which is defined as a ratio of the absolute value of the difference between a composition ratio inside of the particles of or in a small area between the particles of the transition metal and a composition ratio in a bulk state to the composition ratio in a bulk state of the transition metal, is 5% or less.

In an embodiment of the positive electrode active material for lithium ion batteries related to the invention, the positive electrode active material is a lithium-containing transition metal oxide.

In another embodiment of the positive electrode active material for lithium ion batteries related to the invention, the transition metal in the lithium-containing transition metal oxide is at least one or two or more kinds selected from the group consisting of Ni, Mn, Co and Fe.

In still another embodiment of the positive electrode active material for lithium ion batteries related to the invention, an average particle size of particles of the positive electrode active material is 2 to 8 μm, a specific surface area of the positive electrode active material is 0.3 to 1.8 m$^2$/g, and the tap density of the positive electrode active material is 1.5 to 2.1 g/ml.

In another aspect of the invention, the invention relates to a positive electrode for lithium ion batteries, which uses a positive electrode active material for lithium ion batteries related to the invention.

In still another aspect of the invention, the invention relates to a lithium ion battery that uses a positive electrode for lithium ion batteries related to the invention.

In further still another aspect of the invention, the invention relates to a precursor for positive electrode active material for lithium ion batteries which is composed of secondary particles made of at least lithium and transition metal and formed by flocculating primary particles. In the precursor for positive electrode active material, the variation in composition of transition metal that is a main component inside of secondary particles or between the secondary particles of the precursor for positive electrode active material, which is defined as a ratio of the absolute value of the difference between a composition ratio inside of the particles of or in a small area between the particles of the transition metal and a composition ratio in a bulk state to the composition ratio in the bulk state of the transition metal, is 5% or less.

The precursor for positive electrode active material for lithium ion batteries related to the invention includes, in an embodiment, lithium and transition metal as main component.

Advantageous Effect of the Invention

According to the invention, a positive electrode active material for lithium ion batteries, which realizes a lithium ion battery that is, while satisfying fundamental characteristics of a battery (capacity, efficiency, load characteristics), low in the resistance and excellent in the lifetime characteristics, is provided.

DESCRIPTION OF THE PREFERRED EMBODIMENTS (Constitution of Positive Electrode Active Material for Lithium Ion Batteries)

As a raw material of positive electrode active material for lithium ion batteries related to an embodiment of the invention, compounds useful as a positive electrode active material for general positive electrodes for lithium ion batteries can be broadly used. However, lithium-containing transition metal oxides such as lithium cobalt oxide (LiCoO$_2$), lithium nickel oxide (LiNiO$_2$) and lithium manganese oxide (LiMn$_2$O$_4$) can be particularly preferably used. Further, the transition metal in the lithium-containing transition metal oxide is preferred to be one or two or more kinds selected from the group consisting of Ni, Mn, Co and Fe. Further, a ratio of lithium to all metals in the lithium-containing transition metal oxide is preferable to be more than 1.0 and less than 1.3. This is because a stable crystal structure is difficult to maintain when the ratio is 1.0 or less, and high capacity of a battery cannot be secured when the ratio is 1.3 or more. A crystal structure of the positive electrode active material is not particularly restricted as long as it has a structure capable of inserting and removing lithium. However, a layer structure or spinel structure is preferable.

The variation in composition of the transition metal that is a main component inside of secondary particles or between secondary particles of the positive electrode active material for lithium ion batteries can be obtained in the following manner. That is, by use of an apparatus, capable of quantitatively analyzing a small area, such as a field-emission electron probe microanalyzer (FE-EPMA), contents of the respective elements present between secondary particles or inside of the secondary particle are measured, and, by assuming that a content ratio of each of elements to the content of all metals as a composition ratio of each of the elements, the variation in composition ratio is taken as an index. For example, when the contents of elements of Ni, Mn, Co and Fe respectively are N %, M %, C % and F %, and numerical values obtained by dividing by the respective atomic weights and thereby expressed in terms of mole are n, m, c and f, a composition ratio of Ni (molar ratio) is expressed by n/(n+m+c+f)×100 (%).

The variation in composition of the transition metal that is a main component inside of the secondary particles or between the secondary particles of the positive electrode active material for lithium ion batteries is expressed by a ratio of the absolute value of the difference between the composition ratio inside of or in a small region between the particles of the transition metal and the composition ratio in a bulk state to the composition ratio in the bulk state of the transition metal obtained by ICP and the like. The variation in composition related to the invention is 5% or less. This is because when the variation in composition exceeds 5%, the lifetime characteristics are poor and the resistance when used in a battery becomes large.

Further, in the positive electrode active material for lithium ion batteries, it is preferable that an average particle size of the secondary particles is 2 to 8 μm, a specific surface area of the secondary particles is 0.3 to 1.8 m$^2$/g, and the tap density of the secondary particles is 1.5 to 2.1 g/ml. This is because, when deviating from the ranges, high capacity becomes difficult to secure. Further, it is more preferable that an average particle size of the secondary particles is 5 to 7 μm, a specific surface area t of the secondary particles is 0.5 to 1.5 m$^2$/g, and the tap density of the secondary particles is 1.6 to 2.1 g/ml.

(Constitution of Positive Electrode for Lithium Ion Batteries and Lithium Ion Battery Therewith)

The positive electrode for lithium ion batteries related to an embodiment of the invention has a structure where, for example, a positive electrode mixture prepared by mixing the positive electrode active material for lithium ion batteries having the above-described constitution, a conductive additive, and a binder is disposed on one or both surfaces of a current collector made of an aluminum foil. Further, the lithium ion battery related to an embodiment of the invention is provided with the positive electrode for lithium ion batteries having such a constitution.

(Constitution of Precursor for Positive Electrode Active Material for Lithium Ion Batteries)

The precursor for positive electrode active material for lithium ion batteries related to an embodiment of the invention is configured of at least lithium and transition metal and formed of secondary particles where primary particles are flocculated. The precursor for positive electrode active material for lithium ion batteries is a raw material of the positive electrode active material for lithium ion batteries. Similar to the positive electrode active material for lithium ion batteries, the variation in composition of transition metal that is a main component inside of the secondary particles or between the secondary particles, which is defined as a ratio of the absolute value of the difference between the composition ratio inside of the particles of transition metal or in a small region between the particles of the transition metal and the composition ratio in a bulk state of the transition metal to the composition ratio in the bulk state of the transition metal, is 5% or less.

(Method of Manufacturing Positive Electrode Active Material for Lithium Ion Batteries and Lithium Ion Batteries Therewith)

Next, a method of manufacturing the positive electrode active material for lithium ion batteries related to an embodiment of the invention and lithium ion batteries therewith will be described.

Firstly, alkali hydroxide or alkali carbonate is added in an aqueous solution of a salt of transition metal that is a main component, to which a lithium compound is added, to prepare a precursor for positive electrode active material for lithium ion batteries. Alternatively, an aqueous solution of salt of transition metal that is a main component is added to a solution or suspension of alkali hydroxide or alkali carbonate to prepare a precursor for positive electrode active material for lithium ion batteries. In the case of former one, a region high in the pH tends to be locally formed to result in the variation in composition. Accordingly, the latter one is preferred.

Examples of the lithium compounds being added include, without restricting, lithium carbonate, lithium hydroxide, lithium oxide, lithium chloride, lithium nitrate, lithium sulfate, lithium hydrogen carbonate, lithium acetate, lithium fluoride, lithium bromide, lithium iodide and lithium peroxide. Among these, from the viewpoint of easy handling and cheapness, lithium carbonate is preferred.

Examples of aqueous solutions of salt of the transition metal (any one kind or two or more kinds of Ni, Mn, Co and Fe) include a nitrate solution, a sulfate solution, a chloride solution, or an acetate solution. In particular from the viewpoint of avoiding mingling of a negative ion, a nitrate solution is preferably used.

Examples of preferable alkali hydroxides include sodium hydroxide, potassium hydroxide and lithium hydroxide. Examples of preferable alkali carbonates include sodium carbonate, sodium hydrogen carbonate, potassium carbonate and lithium carbonate.

An addition speed of the aqueous solution of salt of transition metal that is a main component affects on the variation in composition of the transition metal that is a main component inside of or between the particles of the precursor for positive electrode active material for lithium ion batteries. That is, when the addition speed is high, local segregation is caused to be likely to generate the variation in composition. Accordingly, the aqueous solution is preferably added at a speed slow enough to be difficult to generate the local segregation. Further, it is also effective to conduct the reaction little by little by use of a micro-reactor or to promote the dispersion of a raw material by applying an ultrasonic vibration to a reactor during the reaction.

More specifically, a concentration of the aqueous solution of salt of transition metal is adjusted to a saturation concentration or a concentration close to the saturation concentration. In the case of saturation concentration, segregation may be caused by variation of the liquid temperature. Accordingly, a concentration close to the saturation concentration is preferred.

In a solution or suspension of alkali hydroxide or alkali carbonate, the concentration is determined by considering a reaction with the transition metal.

An addition speed is different depending on a volume of the reactor. For example, when a reactor having a volume of 1 $m^3$ is used, and 500 to 700 L of an aqueous solution of transition metal salt is added to 300 to 400 L of a suspension of alkali carbonate, an addition speed of the aqueous solution of transition metal salt is 2 to 5 L/min and more preferably 3 to 4 L/min. An addition time is 2 to 5 hr and more preferably 3 to 4 hr.

Next, the resulted precursor for positive electrode active material is, after drying, oxidized (firing in an oxidizing atmosphere) and pulverized under proper condition to obtain a powder of positive electrode active material. Further, in the step of drying, there is no problem in using a known drying method. However, for example, a method such as a fluid bed drying that can inhibit dried powder from flocculating can be preferably used, because particles of the precursor can be more uniformly dispersed. Still further, in the step of firing, a method that promotes contact between the powders during filling can be preferably used, because the reaction is more uniformly conducted. Further, also in the pulverization, there is no problem in using a known method. However, it is desirable to use dry air upon operation to avoid influence of moisture.

By making use of the positive electrode active material for lithium ion batteries obtained like this, according to a known method, a positive electrode for lithium ion batteries and lithium ion batteries therewith can be produced.

In the lithium ion battery formed like this, the composition of the transition metal in the positive electrode active material is inhibited from fluctuating. Accordingly, high capacity, low resistance and long lifetime are realized. Therefore, in large devices that require these characteristics such as automobiles and road levelers, the lithium ion batteries are particularly useful.

EXAMPLES

Examples of the present invention, with comparative examples, will be described as follows, but the following examples are provided for better understanding of the present invention and its advantages, and intended to be non-limiting.

Example A

According to a wet method that uses an aqueous solution of nitrates of Ni, Mn and Co and lithium carbonate, carbonate that is a precursor was prepared. A molar ratio of charge amounts of Ni, Mn and Co at the time of production of the precursor was set to Ni:Mn:Co=1:1:1. The mixture was, after drying, oxidized to form a positive electrode material.

More specifically, in a stirring bath with a propeller blade, lithium carbonate was suspended in pure water, the pH thereof was adjusted to 7, an aqueous solution of nitrates was introduced, and, after the introduction was completed at the pH 4, the stirring was continued for 2 hr. In order to inhibit the variation from occurring during the reaction, ultrasonic dispersion was applied during the stirring.

The prepared precursor was dried as it is without washing. A fluid bed dryer was used to inhibit the particles from sticking fast. An average particle size of dry powder was 10 μm.

This was filled in a sagger and fired. Upon filling, the sagger was vibrated for particles to come into contact with each other. The firing was conducted in air at 800° C. for 10 hr.

After firing, a pulverizer in which the particles collide with each other to pulverize was used. In order to eliminate influence of moisture, the step of pulverizing was conducted under an environment of dry air.

Comparative Example A

After powders of nickel oxide, manganese oxide and cobalt oxide and lithium hydroxide were wet mixed, the mixture was spray dried to prepare dry powder, and the dry powder was oxidized to prepare a positive electrode material. A molar ratio of charge amounts of Ni, Mn and Co at the time of mixing was set to Ni:Mn:Co=1:1:1.

More specifically, the respective raw materials measured in accordance with the ratio of charge amounts were mixed with water in a wet ball mill. The mixing time was set to 6 hr. Thereafter, a raw material slurry from which balls were removed was spray dried to remove moisture, thereby a dry powder was obtained. An average particle size of the dry powder was 30 μm.

The dry powder was filled in a sagger by tapping and fired at 800° C. for 10 hr in air.

After firing, the powder was pulverized with a ball mill.

Contents of Li, Ni, Mn and Co in all positive electrode materials were measured with an inductively-coupled plasma optical emission spectrometer (ICP-OES) and thereby the ratio of the transition metals was confirmed to be the same as the ratio of charge amounts. (The composition ratio in a bulk state was 33.3% by mole for each of Ni, Mn and Co.)

Contents of the respective elements inside of the secondary particles and between the secondary particles were measured for each of the positive electrode materials by FE-EPMA, and results thereof are shown in Tables 1 and 2. Upon measurement, 3 positions inside of the secondary particle and 3 positions between the secondary particles were measured. Each of the contents was calculated in terms of mole and recalculated as a composition ratio. The composition ratio was expressed by a ratio of a molar amount of a specified element and a total molar amount of all metals. As the variation in composition, a numerical value obtained by dividing the absolute value of the difference between the composition ratio and the composition ratio of a bulk measured by ICP-OES by the composition ratio of bulk was used.

TABLE 1

| | | Content (%) | | | Composition ratio (mole %) | | | Variation in composition (%) | | |
|---|---|---|---|---|---|---|---|---|---|---|
| | | Ni | Mn | Co | Ni | Mn | Co | Ni | Mn | Co |
| Example A | 1 | 20.3 | 19.0 | 20.3 | 33.4 | 33.4 | 33.2 | 0.1 | 0.1 | 0.3 |
| | 2 | 20.5 | 18.9 | 20.0 | 33.8 | 33.3 | 32.9 | 1.5 | 0.1 | 1.4 |
| | 3 | 20.2 | 19.5 | 20.5 | 32.9 | 33.9 | 33.2 | 1.4 | 1.7 | 0.3 |
| Comparative example A | 4 | 21.0 | 17.3 | 18.5 | 36.3 | 31.9 | 31.8 | 8.8 | 4.3 | 4.5 |
| | 5 | 18.5 | 18.7 | 18.5 | 32.5 | 35.1 | 32.4 | 2.5 | 5.3 | 2.9 |
| | 6 | 19.8 | 20.2 | 20.0 | 32.3 | 35.2 | 32.5 | 3.1 | 5.6 | 2.5 |

TABLE 2

| | | Content (%) | | | Composition ratio (mole %) | | | Variation in composition (%) | | |
|---|---|---|---|---|---|---|---|---|---|---|
| | | Ni | Mn | Co | Ni | Mn | Co | Ni | Mn | Co |
| Example A | 7 | 20.5 | 19.0 | 20.6 | 33.4 | 33.1 | 33.5 | 0.3 | 0.7 | 0.4 |
| | 8 | 20.9 | 18.9 | 20.3 | 34.1 | 32.9 | 33.0 | 2.3 | 1.2 | 1.1 |
| | 9 | 20.2 | 19.7 | 20.5 | 32.8 | 34.1 | 33.1 | 1.7 | 2.4 | 0.7 |
| Comparative example A | 10 | 21.2 | 17.2 | 18.7 | 36.4 | 31.6 | 32.0 | 9.3 | 5.3 | 4.0 |
| | 11 | 18.3 | 19.0 | 18.5 | 32.1 | 35.6 | 32.3 | 3.7 | 6.8 | 3.1 |
| | 12 | 19.8 | 20.2 | 19.7 | 32.4 | 35.4 | 32.2 | 2.6 | 6.1 | 3.5 |

Further, as an average particle size, a 50% diameter in a particle size distribution according to a laser diffraction method was used, as a specific surface area, a BET value was used, and as a tap density, a density obtained after 200 times of tapping was used. The positive electrode material, a conductive material and a binder were weighed at a ratio of 85:8:7. In a solution obtained by dissolving the binder in an organic solvent (N-methyl pyrrolidone), the material and conductive material were mixed to form a slurry. The slurry was coated on an aluminum foil and, after drying, pressed to form a positive electrode. A 2032 coin cell for use in evaluation, in which Li is used as a counter electrode was prepared, and, with a solution obtained by dissolving 1M-LiPF6 in EC-DMC (1:1) as an electrolytic solution, the charge and discharge operation was conducted under the charge condition of 4.3 V and the discharge condition of 3.0 V. Initial capacity and initial efficiency (discharge amount/charge amount) were confirmed under the charge/discharge at 0.1 C. Further, the resistance was estimated from a decrease in voltage from charge end to discharge start. As the lifetime, the capacity retention rate after 30 cycles at room temperature was confirmed. These results are shown in Table 3.

TABLE 3

| | Average particle size μm | Specific surface area m²/g | Tap density g/ml | Capacity mAh/g | Efficiency % | Resistance mΩ | Lifetime % |
|---|---|---|---|---|---|---|---|
| Example A | 5.5 | 1.24 | 2.0 | 155 | 90.3 | 0.5 | 98 |
| Comparative example A | 8.3 | 1.08 | 2.0 | 150 | 87.6 | 1.1 | 92 |

Example B

According to a wet method that uses an aqueous solution of nitrates of Ni, Mn and Fe and lithium carbonate, carbonate that is a precursor was prepared. A molar ratio of charge amounts of Ni, Mn and Fe at the time of production of the precursor was set to Ni:Mn:Fe=6:2:2. The mixture was, after drying, oxidized to form a positive electrode material.

More specifically, in a stirring bath with a propeller blade, lithium carbonate was suspended in pure water, the pH was adjusted to 7, an aqueous solution of nitrates was introduced, and, after the introduction was completed at the pH 4, the stirring was continued for 2 hr. In order to inhibit the variation from occurring during the reaction, ultrasonic dispersion was applied during the stirring.

The prepared precursor was dried as it is without washing. A fluid bed dryer was used to inhibit the particles from sticking fast. An average particle size of dry powder was 10 µm.

This was filled in a sagger and fired. Upon filling, the sagger was vibrated for particles to come into contact with each other. The firing was conducted in air at 800° C. for 10 hr.

After firing, a pulverizer in which the particles collide with each other to pulverize was used. In order to eliminate influence of moisture, the step of pulverizing was conducted under an environment of dry air.

Comparative Example B

After powders of nickel oxide, manganese oxide and iron oxide and lithium hydroxide were wet mixed, the mixture was spray dried to prepare dry powder, and the dry powder was oxidized to prepare a positive electrode material. A molar ratio of charge amounts of Ni, Mn and Fe at the time of mixing was set to Ni:Mn:Fe=6:2:2.

More specifically, the respective raw materials weighed in accordance with the ratio of charge amounts were mixed with water in a wet ball mill. The mixing time was set to 6 hr. Thereafter, a raw material slurry from which balls were removed was spray dried to remove moisture, thereby a dry powder was obtained. An average particle size of the dry powder was 30 µm.

The dry powder was filled in a sagger by tapping and fired at 800° C. for 10 hr in air.

After firing, the pulverization was conducted with a ball mill.

Contents of Li, Ni, Mn and Fe in all positive electrode materials were measured with an inductively-coupled plasma optical emission spectrometer (ICP-OES) and thereby the ratio of the transition metals was confirmed to be the same as the ratio of charge amounts. (The composition ratio in a bulk state was Ni:Mn:Fe=6:2:2 by molar ratio of Ni, Mn and Fe.)

Contents of the respective elements inside of the secondary particles and between the secondary particles were measured for each of the positive electrode materials by FE-EPMA, and results thereof are shown in Tables 4 and 5. Upon measurement, 3 positions inside of the secondary particle and 3 positions between the secondary particles were measured. Each of the contents was calculated in terms of mole and recalculated as a composition ratio. The composition ratio was expressed by a ratio of a molar amount of a specified element to a total molar amount of all metals.

As the variation in composition, a numerical value obtained by dividing the absolute value of the difference between the composition ratio and the composition ratio of a bulk measured by ICP-OES by the composition ratio of bulk was used.

TABLE 4

| | | Content (%) | | | Composition ratio (mole %) | | | Variation in composition (%) | | |
|---|---|---|---|---|---|---|---|---|---|---|
| | | Ni | Mn | Fe | Ni | Mn | Fe | Ni | Mn | Fe |
| Example B | 1 | 35.7 | 11.0 | 11.2 | 60.3 | 19.8 | 19.9 | 0.4 | 0.8 | 0.6 |
| | 2 | 36.2 | 11.1 | 11.1 | 60.6 | 19.9 | 19.5 | 1.0 | 0.7 | 2.3 |
| | 3 | 36.0 | 10.8 | 11.2 | 60.7 | 19.5 | 19.8 | 1.2 | 2.7 | 0.8 |
| Comparative example B | 4 | 39.0 | 11.0 | 10.8 | 62.8 | 18.9 | 18.3 | 4.7 | 5.4 | 8.6 |
| | 5 | 34.4 | 11.5 | 10.8 | 59.2 | 21.2 | 19.6 | 1.2 | 5.8 | 2.2 |
| | 6 | 35.6 | 12.0 | 11.2 | 59.1 | 21.3 | 19.6 | 1.4 | 6.5 | 2.2 |

TABLE 5

| | | Content (%) | | | Composition ratio (mole %) | | | Variation in composition (%) | | |
|---|---|---|---|---|---|---|---|---|---|---|
| | | Ni | Mn | Fe | Ni | Mn | Fe | Ni | Mn | Fe |
| Example B | 7 | 36.2 | 11.2 | 11.5 | 60.1 | 19.9 | 20.0 | 0.1 | 0.7 | 0.3 |
| | 8 | 35.8 | 10.9 | 11.0 | 60.7 | 19.7 | 19.6 | 1.1 | 1.3 | 2.0 |
| | 9 | 36.5 | 11.3 | 11.4 | 60.3 | 19.9 | 19.8 | 0.5 | 0.3 | 1.1 |
| Comparative example B | 10 | 38.2 | 10.8 | 11.0 | 62.3 | 18.8 | 18.9 | 3.9 | 5.9 | 5.7 |
| | 11 | 34.8 | 11.3 | 12.1 | 58.4 | 20.3 | 21.3 | 2.7 | 1.3 | 6.7 |
| | 12 | 36.2 | 12.3 | 11.9 | 48.5 | 21.3 | 20.2 | 2.4 | 6.2 | 1.1 |

Further, as an average particle size, a 50% diameter in a particle size distribution according to a laser diffraction method was used, as a specific surface area, a BET value was used, and as a tap density, a density obtained after 200 times of tapping was used. The positive electrode material, a conductive material and a binder were weighed at a ratio of 85:8:7. In a solution obtained by dissolving the binder in an organic solvent (N-methyl pyrrolidone), the material and conductive material were mixed to form a slurry. The slurry was coated on an aluminum foil and, after drying, pressed to form a positive electrode. A 2032 coin cell for use in evaluation, in which Li is used as a counter electrode was prepared, and, with a solution obtained by dissolving 1M-LiPF6 in EC-DMC (1:1) as an electrolytic solution, the charge and discharge operation was conducted under the charge condition of 4.3 V and the discharge condition of 3.0 V. Initial capacity and initial efficiency (discharge amount/charge amount) were confirmed under the charge/discharge at 0.1 C. Further, the resistance was estimated from a decrease in voltage from charge end to discharge start. As the lifetime, the capacity retention rate after 30 cycles at room temperature was confirmed. These results are shown in Table 6.

TABLE 6

| | Average particle size µm | Specific surface area m²/g | Tap density g/ml | Capacity mAh/g | Efficiency % | Resistance mΩ | Lifetime % |
|---|---|---|---|---|---|---|---|
| Example B | 6.2 | 1.02 | 2.0 | 167 | 90.2 | 0.8 | 96 |
| Comparative example B | 9.5 | 1.16 | 2.0 | 155 | 88.8 | 1.6 | 89 |

What is claimed is:

1. A manufacturing method of a positive electrode active material for lithium ion batteries which is composed of at least lithium and transition metal, wherein the variation in the composition of transition metal inside of particles or between particles of the positive electrode active material is 5% or less, wherein the variation is defined as a ratio of the absolute value of the difference between a composition ratio of the transition metal inside of the particles or in a small area between the particles and a composition ratio in a bulk state to the composition ratio of the transition metal; said method comprising:
   forming a precursor by adding alkali hydroxide or alkali carbonate to a solution comprising a lithium compound and a salt of one or more transition metals, and by stirring said precursor while applying ultrasonic dispersion;
   drying said precursor;
   and oxidizing the dried precursor.

2. The manufacturing method of a positive electrode active material for lithium ion batteries of claim 1, wherein the positive electrode active material is a lithium-containing transition metal oxide.

3. The manufacturing method of a positive electrode active material for lithium ion batteries of claim 2, wherein the transition metal in the lithium-containing transition metal oxide is at least one or more selected from the group consisting of Ni, Mn, Co and Fe.

4. The manufacturing method of a positive electrode active material for lithium ion batteries of claim 1, wherein an average particle size of particles of the positive electrode active material is 2 to 8 μm, a specific surface area of the positive electrode active material is 0.3 to 1.8 $m^2/g$, and the tap density of the positive electrode active material is 1.5 to 2.1 g/ml.

5. The manufacturing method of a positive electrode active material for lithium ion batteries of claim 2, wherein an average particle size of particles of the positive electrode active material is 2 to 8 μm, a specific surface area of the positive electrode active material is 0.3 to 1.8 $m^2/g$, and the tap density of the positive electrode active material is 1.5 to 2.1 g/ml.

6. The manufacturing method of a positive electrode active material for lithium ion batteries of claim 3, wherein an average particle size of particles of the positive electrode active material is 2 to 8 μm, a specific surface area of the positive electrode active material is 0.3 to 1.8 $m^2/g$, and the tap density of the positive electrode active material is 1.5 to 2.1 g/ml.

* * * * *